(12) United States Patent
Smith et al.

(10) Patent No.: US 10,212,059 B2
(45) Date of Patent: *Feb. 19, 2019

(54) SYSTEM AND METHODS FOR RECORDING AND RECREATING INTERACTIVE USER-SESSIONS INVOLVING AN ON-LINE SERVER

(71) Applicant: USER REPLAY LIMITED, Theale, Berkshire (GB)

(72) Inventors: Philip Smith, Alresford (GB); Peter Western, Guildford (GB); Michael Simms, Nottingham (GB)

(73) Assignee: USER REPLAY LIMITED, Theale (GB)

( * ) Notice: Subject to any disclaimer, the term of this patent is extended or adjusted under 35 U.S.C. 154(b) by 10 days.

This patent is subject to a terminal disclaimer.

(21) Appl. No.: 15/232,654

(22) Filed: Aug. 9, 2016

(65) Prior Publication Data

US 2017/0134248 A1  May 11, 2017

Related U.S. Application Data

(63) Continuation of application No. 14/855,047, filed on Sep. 15, 2015, now Pat. No. 9,497,091, which is a
(Continued)

(30) Foreign Application Priority Data

Sep. 8, 2014 (GB) .................................. 1415860.4

(51) Int. Cl.
*G06F 15/16* (2006.01)
*H04L 12/26* (2006.01)
(Continued)

(52) U.S. Cl.
CPC .......... *H04L 43/06* (2013.01); *G06F 11/3438* (2013.01); *G06F 11/3476* (2013.01);
(Continued)

(58) Field of Classification Search
CPC ... H04L 69/329; H04L 65/1013; H04L 67/02; H04L 67/42; G06F 17/30873; G06F 17/30876; G06F 17/3089; G06F 17/30899
See application file for complete search history.

(56) References Cited

U.S. PATENT DOCUMENTS 6,286,030 B1  9/2001  Wenig et al.
7,941,525 B1  5/2011  Yavilevich
(Continued)

FOREIGN PATENT DOCUMENTS

WO  2008/112615 A2  9/2008

OTHER PUBLICATIONS

International Search Report and Written Opinion for PCT Application No. PCT/GB2014/053433 dated Mar. 31, 2015.

*Primary Examiner* — Hitesh Patel
(74) *Attorney, Agent, or Firm* — Maschoff Brennan (57) ABSTRACT

An auditing system and method is configured to capture and report an interactive client journey between a web browser and a website. Instantiation of control code at an end-user computing device brings about the capture of server and request headers from the perspective of the locally-executing web browser. The control code causes the sending of an uplink journey report to a cloud-based processing server that uses the report to interpret the server and request headers to imply real-time interactions between the end-user. Capture may be based on AJAX requests related to end-user interaction; and data calls made to the e-commerce server during the web session. Client-side capture provides installation of control code that can be delivered directly from a content
(Continued)

distribution network. The processing server correlates the server and request headers with predefined flagged events.

19 Claims, 4 Drawing Sheets

Related U.S. Application Data continuation of application No. PCT/GB2014/053433, filed on Nov. 20, 2014.

(51) Int. Cl.
*H04L 29/08* (2006.01)
*G06F 11/34* (2006.01)

(52) U.S. Cl.
CPC .......... *H04L 43/045* (2013.01); *H04L 43/062* (2013.01); *H04L 67/02* (2013.01); *H04L 67/10* (2013.01); *H04L 67/22* (2013.01); *G06F 2201/86* (2013.01); *G06F 2201/875* (2013.01)

(56) References Cited

U.S. PATENT DOCUMENTS

| | | | |
|---|---|---|---|
| 8,402,011 B1* | 3/2013 | Bodenhamer | G06F 17/30896 707/706 |
| 2008/0177994 A1* | 7/2008 | Mayer | G06F 9/4418 713/2 |
| 2010/0042573 A1 | 2/2010 | Wenig et al. | |
| 2011/0196725 A1* | 8/2011 | Malcolmson | G06Q 30/02 705/14.16 |
| 2011/0213822 A1 | 9/2011 | Yavilevich | |
| 2012/0018506 A1 | 1/2012 | Hammad et al. | |
| 2012/0173966 A1* | 7/2012 | Powell | G06Q 30/0241 715/234 |
| 2013/0128883 A1* | 5/2013 | Lawson | H04M 1/2473 370/352 |
| 2014/0108911 A1 | 4/2014 | Damale | |

\* cited by examiner

SYSTEM AND METHODS FOR RECORDING AND RECREATING INTERACTIVE USER-SESSIONS INVOLVING AN ON-LINE SERVER

CROSS-REFERENCE TO RELATED APPLICATIONS

This application is a continuation of U.S. patent application Ser. No. 14/855,047, filed Sep. 15, 2015, which is a continuation of PCT Application No. PCT/GB2014/053433, filed Nov. 20, 2014, which claims priority to GB Application No. 1415860.4, filed Sep. 8, 2014, all of which are incorporated herein by reference in their entireties.

FIELD

This invention relates, in general, to a system and method for auditing network applications and is particularly, but not exclusively, applicable to systems and methods that record, recreate or analyze interactive user sessions with an automated on-line server to determine and identify anomalies arising in the interaction path.

BACKGROUND

In today's electronic world, businesses frequently make use of e-commerce and web-based on-line services to support business activities. These activities—which may take the form of anything from ordering an article of commerce (or service) to attempting to respond to business-initiated questions to provide business feedback—involve an interactive user journey in cyberspace. In real time, this journey necessitates keystroke entries, data selection actions for window pull-down options and mouse movements by the end-user on, typically, a HTML-generated page. From the end user's perspective, the journey may be viewed (at least to some extent) on a computer monitor or PDA screen.

U.S. Pat. No. 6,286,030—Wenig et at (and the corresponding European patent EP 1097428) describes a system and method for auditing network applications. More particularly, the system operates from the perspective of the server to capture transmissions during a user session between a client and the server. An auditor capture filter captures and stores each request from the client and each response by the server to each request in an auditor storage. An auditor analyzer may use the captured requests and the captured responses to visually recreate the user session to thereby analyze what transpired during the user session.

Unfortunately, with the nature of the communication path and also the nature of data entry, uncertainty frequently exists with respect to what information or instructions have been successfully communicated. For example, HTML-based pages and/or applications can leave doubts in the mind of the end user as to whether data entry has been successfully completed. In other words, when there's a connection hang-up and/or potentially the freezing of the screen at the end user's computer, at the point of re-boot the web browser generally cannot recover the precise state of entered data fields and/or otherwise the user is left bemused as to whether or not the last (or indeed any) data entry was successfully communicated and, for example, whether the client has actually placed and order.

Furthermore, from the perspective of the server and especially the business, when an on-line client interaction fails to finish at a reasonably projected, i.e. anticipated, point of business completion, existing systems generally fail to provide any rationale for the failure. For example, during on-line shopping, a user may suddenly and unexpectedly terminate an order process for a dress by leaving a web browser-based page (and even the entire website), notwithstanding that the user has potentially completed 99% of a transaction process. It may be, for example, that the client wanted to order a size "M" coat in red, but the pull down menu only listed the size "M" in colour ways blue and green (with red "out of stock" for size "M"). While the loss of one client at one time may not seem a catastrophe, the "aggregation of marginal gains" philosophy indicates that, statistically, singular events stack up and represent a real loss of business opportunities.

The aforementioned U.S. Pat. No. 6,286,030-Wenig patent established that data auditing could be achieved from the server-side only. The commercial implementation of the audit process has seen a data TAP placed behind a company file wall and in front of a server, i.e. on premise delivery of a service; this is time-consuming, expensive and leads to access and installation issues. A later refinement of this approach—see US20100042573—established that a web browser at the client could be provided with tag code/JavaScript configured to capture local client events, namely timing information, on-screen events, mouse activity and "click" actions, and then to communicate these captured events over a common communication path back to the proprietary server (behind the firewall). The data TAP then captures the incoming data and routes all this upcoming data to a capture box for audit analysis based on the client-side capture information. However this approach is complex, even more time-consuming than server-side alone, expensive to implement and leads to access and installation issues.

A slightly different approach sees tag code/JavaScript installed on a web browser at a client for a purely client-side capture approach, with the tag code both causing capturing of data related to activity on the client device and establishment of a distinct, secure (cloud-based) uplink reporting path independent of any client-server website traffic. In a similar way to the earlier, purely server-side system, a server supporting a website is located behind a firewall. A separate data aggregator—again behind a firewall—receives compressed uplink data over the secure dedicated path from the client computer running the web browser over the distinct uplink path. The website and the data aggregator are in linked communication with each other, with the link both allowing the aggregator to send report to the server and to send "spiders" to the website to retrieve data from the website that can be used to augment cloud-recovered data to provide fixed-format reports. This approach is embodied in the ClickTale® system (see US2011213822-Yavilevich) where an operative/team is/are able to view on-demand session playbacks from individual customers as captured and relayed by the java applet in the web browser on only the client side. This client-side system therefore captures the user journey and permits visual replay of those journeys in terms of on-screen mouse movements, and does not consider context or relevant background data. Although provided as software, the client-side system is inflexible since reports are fixed by an independent data aggregator owned, generally, by a third party not associated with the server and business web-site under investigation and are not subject to completely flexible definition by the end-user. In particular access to the underlying user journey data via a standard database language, such as SQL, is not available. More particularly, if a particular flagged event report is required, it would be necessary to embed and/or pre-install compatible, i.e. fully operational and debugged, code defining the event into both the e-commerce website and also the client's machine for execution by the client's web browser. Consequently, the nature of purely client-side capture of a user journey is not practical for effective hypothesis testing of many categories of website specific conversion barriers and user-interaction since continuous software changes to define events would lead to operational instability of the code used in the system. Rather, existing client-side capture is used to watch a video of the screen and mouse movements at a specific user, and is useful for testing end user experience. Conversely, the system is not good, i.e. poor, for identifying, technically diagnosing, quantifying and fixing the many categories of conversion barrier that prevent a final e-commerce transaction and which conversion barriers are specific to the web-site being audited. Conversion barriers include hard to replicate technical and performance problems of the specific website code and non-obvious problems with design or function of the user interface to the website.

To date, therefore, server-side capture with its associated costs of implementation has been the architecture and process by which web-site operation has been tested or assessed.

SUMMARY OF THE DISCLOSURE

According to a first aspect of the invention there is provided a method of recording and recreating an interactive end-user journey with a web-site supported by a web-server, access to the web-site provided over a communications network, the method comprising: at a computing device of an end-user, during a web session with a web browser, instantiating code modules configured to control: capture server and request headers from the perspective of the web browser, the capture of server and request headers reflecting the interactive end-user journey; sending, to a processing server over the communications network, an uplink journey report including said server and request headers; and at the processing server, in response to receipt of the uplink report journey uploaded by the computing device, executing code to interpret the server and request headers to imply real-time interactions between the end-user, the web browser executing on the computing device and the web-server.

In a preferred embodiment, the method further comprises, at the processing server, correlating the server and request headers with predefined flagged events related to at least one of operation of the web-server and data processing at the web-server.

The method preferably includes, within a cloud-based computing environment including at least the processing server, providing an access portal through which flagged events can be stored in a database.

A neural network, coupled to the processing server, is preferably configured to identify negative and/or positive correlation between reported end-user interactions and system operational performance, including identifying end-user interactions that are abnormal, unexpected or develop into a recognizable trend for multiple end-users.

Preferably, the step of capturing server and request headers is based on the capture of at least: i) AJAX requests related to end-user interaction; and ii) data calls made to the e-commerce server during the web session.

Additionally, at the computing device, the method may execute code to capture and report, to the processing server, mobile gestures that, when executed on a touch screen, bring about a real-world change in display properties of the computing device or computing device operation, wherein the processing server thereby receiving, in the context of a data call to the website, an indication of visually-discernible changes occurring at the computing device on a per page basis.

In a second aspect of the present invention there is provided a computer program product comprising code that, when loaded into a computer, executes to cause the computer to capture and report an interactive end-user journey with a web-site, the code including procedure to: capture server and request headers from the perspective of locally-executing web browser, the capture of server and request headers reflecting the interactive end-user journey; send, to a processing server over the communications network, an uplink journey report including said server and request headers, the uplink journey report permitting the processing server to interpret the server and request headers to imply real-time interactions between the end-user, the web browser executing on the computing device and the web-server.

In a further aspect of the invention there is provided a system for auditing a web-server application requiring end-user interactions, the system comprising: i) a content distribution network containing downloadable a control code module arranged, when instantiated locally on a computing device running a web browser, to instruct the computing device to: a) capture server and request headers from the perspective of data entry and display events with respect to the web browser, the capture of server and request headers reflecting an interactive end-user journey with the web-browser and the web-server; and b) send, to a processing server, an uplink journey report including said server and request headers; and ii) a processing server operationally responsive to receipt of uplink report journeys uploaded by at least one computing device, the processing server arranged to interpret the server and request headers to imply real-time interactions between the end-user, the web browser executing on the computing device and the web-server.

Preferably, the processing server is configured to correlate the server and request headers with predefined flagged events related to at least one of operation of the web-server and data processing at the web-server.

The processing server is preferably a distributed system that is cloud-based and the processing server provides an access portal through which flagged events can be stored in a database.

A neural network may be coupled to the processing server, the neural network configured to identify negative and/or positive correlation between reported end-user interactions and system operational performance, including identifying end-user interactions that are abnormal, unexpected or develop into a recognizable trend for multiple end-users.

Preferably, the content distribution network includes logic that selectively controls the download of the control modules to the web browser.

Generally, the preferred embodiments have control code module that cause the computing device on which it is loaded to capture at least: i) AJAX requests related to end-user interaction; and ii) data calls made to the e-commerce server during the web session.

The control code module may further includes code to capture and report, to the processing server, mobile gestures that, when executed on a touch screen, bring about a real-world change in display properties of the computing device or computing device operation, and wherein the processing server is configured to acquire, within the uplink journey report, an indication of visually-discernible changes occurring at the computing device on a per page basis.

The content distribution network may include a decision engine configured to determine the nature of the control code module, if any, returned to the computing device making the request.

The present invention advantageously provides a system and process that can record and identify computer glitches, e.g. deficient functional programming or bugs, and/or other e-commerce-based anomalies that arise during the course of a user session or transaction (such as a requirement to enter a postcode/zip code multiple times within a single e-commerce transaction or the number of entry attempts made to make a product selection). Additionally, the system and operating methodology of the present invention can positively identify system events to prevent, for example, fraudulent transactions and/or customer problems that require proactive and direct help.

Implementation of the control algorithms provides rich data harvesting functionality with no discernible disruption from the perspectives of the user or server-side. Using downloadable code, such as selected targeted JavaScript, the system is able to capture all data and user interaction (with no interruption of system operation) and to link this data to specified "flagged" events to permit hypothesis testing of operation of an e-commerce website. The preferred embodiment captures contextually relevant data from both the perspectives of the server and client/user, but not unnecessary any or copious amounts of screen data. Rather, the capture mechanism permits a complete user journey (i.e. network and local computer interactions) to be captured and recreated at a later point to extract selectable "flagged events" identified by a business as relevant or of interest to the operation of its web-site and/or to client interactions. The nature of the innovative client-side capture, supported by delivery as software as a service, permits composite, event-defined information to be present only within a capture box distributed within the cloud. The collection and reporting mechanisms are therefore invisible both to the e-commerce website and the client alike. The various embodiments therefore deliver full tracking and audit functionality from the perspectives of both the client-side and server-side, without the need for full, or indeed any, installation of a network TAP behind a firewall of a proprietary system.

The preferred embodiments therefore provides easily client delivery of a technical audit solution in the form of software-as-a-service ("SaaS") that allows generation of user-configurable reports. The system advantageously needs no network TAP and does not disrupt existing system when retrospectively fitted. Indeed, the system of the preferred embodiment does not require installation behind any third part fire wall. The provision of control algorithms and delivery of tags is, furthermore, inexpensive and fast. No data storage is required at the client or indeed at or with the website owner, with user journey reporting accomplished via the cloud to a dedicated capture box accessed by an auditor.

Reported interactions, whether these are data calls or AJAX requests, cause the sending of data to the server for recording in a database for either real time or historical analysis.

BRIEF DESCRIPTION OF THE DRAWINGS

Exemplary embodiments of the present invention will now be described with reference to the accompanying drawings, in which.

DETAILED DESCRIPTION

Figure 1:
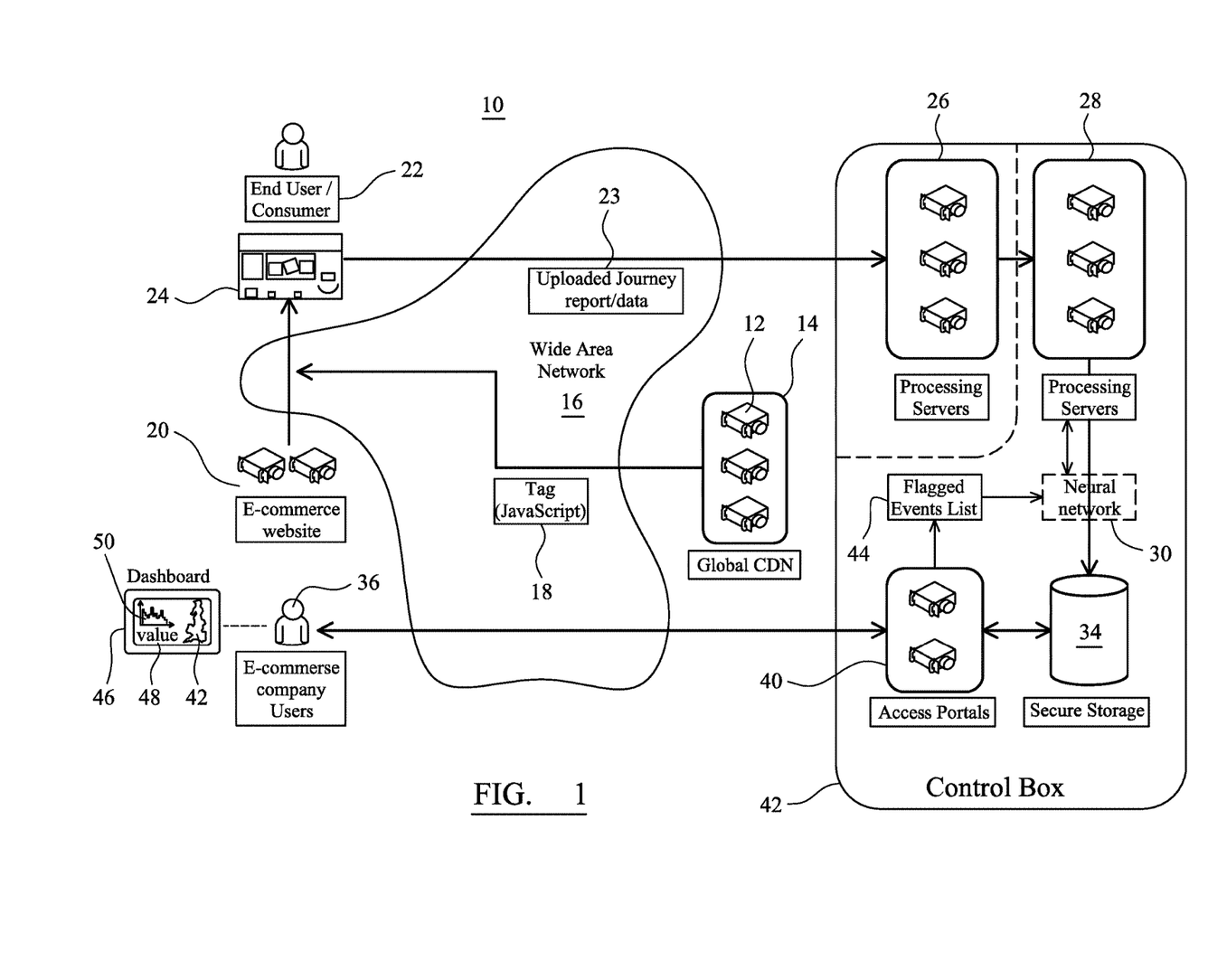
FIG. 1 is a schematic diagram of a data auditing system according to a preferred embodiment of the present invention.

FIG. 1 shows a schematic diagram of a data auditing system 10 according to a preferred embodiment of the present invention.

A content distribution network (CDN) 12—typically located at an independent audit company 14—is programmed with insertable code modules that are downloaded, over a network 16 (such as a WAN), to either an e-commerce website 20 for subsequent delivery to an end user/client's computing device 22 or otherwise downloaded directly to an end user/client's computing device 22. The end user/client's computing device may be, for example, a PDA, smartphone, tablet or computer. The insertable code modules 18 are, for example, JavaScript and provide a set of control instructions for causing the capture of user interactions, such as AJAX requests and general data calls. The communicated JavaScript 18 (stored and administered at the CDN 12) therefore acts to serve control content to end users, with the content having high availability and high performance.

The e-commerce web site 20, which may be that of a retailer of goods (e.g. clothes) or services (e.g. holidays), is supplied with the tags that are embedded into web-pages 24 communicated to the end user's computer 22 at the point of a data call for a specific web page. These tags provide a direction to an address storing code modules typically in the form of JavaScript. Alternatively, the insertable code modules 18 may be sent to directly to the end user's computing device 22 during a data call or independently of the data call (so as simply to reside on the client's machine until needed).

Typically, the supply of the insertable code module 18 follows a process in which the user recovers a website homepage following an uplink request for access (as supported by the user's web browser). The homepage includes embedded metadata, such as a tag to an address location that stores the executable JavaScript code, which homepage (when run on the user's computing device 22) causes a download request for the code module from the address location of the CDN 12. At the CDN 12, a decision engine may determine what insertable code modules and, indeed, whether any monitoring control algorithm (in the exemplary but preferred form of JavaScript) is returned to the end user's computing device 22 for local execution. The decision engine can therefore send back device specific code, e.g. Android® -specific code rather than Apple Mac® specific code, relevant to the computing platform that was used to send the request.

In the event that the decision engine decides not to effect sampling of upcoming interactions between the end user's computing device 22 and website 24, the CDN 12 may still send a reply albeit that the reply is an empty file having no effective executable code.

The insertable code module(s) 18 cause execution of code that registers various event handlers/listeners on the element nodes inside a Document Object Model (DOM) tree, such as HTML, XHTML, XUL and SVG documents. In other words, the code module 18 permits capture and then upload (in a user journey report 23 sent, typically, as encoded data packets across the network 16) of, for example, customer modified HTML as experienced at the client computing device by the user, i.e. the code module functions to capture the user-experienced state of the locally rendered page as produced and/or seen on the end user's computing device 22. More specifically, in a preferred embodiment, local instantiation of the JavaScript 18 (of the code module) results in the execution of control code in the end user's computing device 22 that monitors, captures and then relays at least (i) AJAX requests as well as (ii) other data calls made to the e-commerce server with which the end user's computer 22 is interacting/communicating. The JavaScript of the insertable code modules 18 may optionally also monitor, capture and report mobile gestures that, when executed on a touch screen device, bring about a real-world change in display properties or device operation. The user journey report 23 therefore captures visually-discernible changes at the computing device on a per page basis, as well as contextually relevant data calls.

The capture of AJAX requests at the client with client-side code overcomes the restrictions of TAP-based solutions implemented behind a firewall. The preferred embodiment augments basic, per-page tag operation to build a reporting structure operative at an action based level of system interactions (at both the client and server).

Reporting of AJAX requests and data calls, including but not limited to forms and document object models, from the client-side may take place substantially in real time, although they may be collated locally at the client's computing device and then sent as a composite file either at the end of a session or at another time.

More particularly, the code modules 18 of the preferred embodiments are able to capture server and request headers at the client side, to report these interactions and therefore to permit system intelligence to interpret and/or correlate the headers of each request, especially in the context of pre-defined flagged events. The ability to access and report such server and request headers from the client side provides significantly enhanced and flexible auditing functionality of each user journey.

As will be understood, AJAX is the acronym for Asynchronous JavaScript and XML and is a group of interrelated web development techniques used on the client-side to create asynchronous web applications. With AJAX, web applications can send data to, and retrieve data from, a server asynchronously (in the background) without interfering with the display and behavior of the existing page on the client device. More specifically, despite the name, the use of XML is not required, albeit that a preferred embodiment uses the XMLHttpRequest object to support retrieval of data. In fact, using alternative scripting would permit synchronous communication, as will be understood. For example, one could consider the use of a permanent channel and WebSocket' as a reporting transfer mechanism. WebSocket' is a protocol providing full-duplex communications channels over a single TCP connection, as will be understood, and was standardized by the IETF as RFC 6455 in 2011.

As will be understood, AJAX is one of many scripting language that could be employed in setting up control code communicated in the JavaScript code module 18 and, as such, the term "AJAX" should be understood to include functionally equivalent code in alternative languages. The term "AJAX requests" should, unless the specific context requires a more limited interpretation, therefore be understood to represent a generic group of activities that bring about a functional or visual change at the user's computing device following user interaction with each web page as presented for view by a local web browser on the computing device 22. Use of the term "AJAX" request(s) in the appended claims is therefore only limiting to the extent that is defines a group of similar protocols that can monitor triggers indicative of interactions with the end-user and/or server from the perspective of the end-user's web browser.

Returning to FIG. 1, the uploaded journey report/data 23 are routed, via the network 16, to SaaS servers 26. These SaaS servers 26 are configured to remove the uploaded journey report/data 23 from the communication path and so as to realize a buffer that addresses if not overcomes potential processing delays within the system 10. The SaaS servers 26 can independently, or in combination with the CDN 12, apply filtering to the incoming journey report/data to select a sample. Sampling may be based on a percentage of client access to a web page, e.g. one-in-ten, or other rules including, but not limited to, (i) geographic location as reported by the client computing device or inferred by a packet header and/or (ii) demographics; (iii) the type of interacting computing device as identified in the metadata of the header used in uplink transmissions; (iv) IP address ranges; (v) fixed sampling rates per agreed time period; and/or (vi) a fixed percentage of all journeys. Other filters may be selected and applied, as desired, to reflect statistically relevant data sets for a particular investigation or industry. Filter settings are therefore a design option and customizable by the SaaS website client.

Once extracted by the SaaS servers 26, the journey report/data 23 is communicated to processing servers 28 that may be supported by an optional neural network 30. The processing servers 28 and/or the neural network 30 control and audit data in that they are configured to spot anomalies arising with expected or standard operation of the website 20 or even the computing device 22 of the client/end user, including (for example) fraudulent activity arising from (i) too many log-in attempts, or (ii) noticeably above or below average financial check-out values or (iii) the number of payment failures recorded against an account relative to historical records. Further, they may be arranged to conduct trend analysis and/or to identify anomalies between projected actions of users and actual reported actions of users. To build a statistically significant audit, processed information is securely stored in a data base/data aggregator 34 that may receive independent journey report information from multiple SaaS servers and multiple processing servers; three of each are shown in FIG. 1 for exemplary and illustrative purposes only. Stored and processed journey information, or derivative reports, may be accessed in real time or on an historical basis.

The processing servers 28 are configured to interpret the request headers sent from the end user 22 in the uploaded journey report data 23. The processing servers 28 uses these request headers to imply what would have been the request headers actually sent in real time between and to the end user 22 and the e-commerce server 20 with which end user is interacting. Interpretation of the request headers at the processing servers therefore allows for comparison with defined flagged events.

Analysis may, in fact, be targeted to specific device configurations since uplink reporting preferably (if not conventionally) maintains device configuration information defined within packet headers communicated by the device under investigation. Consequently, the processing servers 28, as optionally supported by the neural network, may filter uplink journey report data according to device categories, e.g. mobile or geographically fixed and/or by device manufacturer.

Employees, agents or consultants (e.g. an auditor) 36 of the owner of the web site 20 are permitted networked on-line access to the data base/data aggregator 34 through an access portal 40 that typically requires a log-in process.

A capture box 42 for recreating and analyzing interactive user sessions is therefore realized by a combination of the processing servers, optional neural network 30, data database/data aggregator 34 and access portal 40 that can, if desired, be entirely implemented in a cloud-based solution. The capture box is typically a distributed system based, potentially, entirely in the cloud.

By accessing the capture box 42 through the access portal 40, the employees, agents or consultants 36 are therefore able to draw audit reports from the database/data aggregator 34 and, furthermore, to direct assembly of reports based on auditor-defined "flagged" events. Flagged events can take a number of forms, including but not limited to: (i) identified language or text; (ii) the absence of expected text with a predetermined period of time, such as the lack of receipt of an order quantity number; (iii) web page refresh times or volumes; (iv) web page load times; (v) overall speed of, for example, client interactions with the web pages supported on the web browser; (vi) absolute file and/or attachment size; (vii) other measurable parameters or triggers identified as being of relevance to operation of the website 20; and (viii) repeated interaction behavior, e.g. multiple user log-in attempts.

A flagged events list 44, used in the processing of data, can be revised at the option of a subscriber to the data audit service, with the flagged events list 44 permitting identified events to be sought out by the processing servers 28 (and/or neural network 30) from the uplinked journey report/data 23.

The preferred embodiment is now able to replicate accurately a user journey based on: (i) captured AJAX requests that reflect changes at an action-based level at the user's computing device (e.g. mobile gestures or the selection of a value or quality from a drop down menu; and ii) data calls to the server. This functionality is attained without having to install a TAP behind a firewall and, moreover, permits for a system auditor 36 the ability to apply changeable filtering mechanisms to the data through identification and selection of feature events that are likely or expected to occur through the course of a typical user interaction. Correlation of a user journey with flagged (user) events provides a high degree of flexibility in auditing of the website and, indeed, the operative functionality of software. Correlation with the user journey also provides for greater appreciation of events of interests arising during user journeys and which consequently affect the aggregation of marginal gains. With the flagged events defined within the capture box 42 and with correlation of the user journey with flagged events occurring in the capture box 42, the processing servers are able to test operational hypothesis and to identify abnormal or unusual interactions with the website or unexpected behavioral patterns of the end-user.

To assist the auditor 36 to access real time or historical data of one or multiple user journeys, a control interface (such as in the form of a dashboard 46) presents data as values 48, graphs 50 and text reports or pictorial information 52 on a computer monitor or touchscreen. The dashboard 46, which itself may be browser-based or locally installed software, allows for selectively filtered data of one or more user journeys to be presented for analysis in a step-by-step fashion to replicate the information and actions presented to the user of their computing device 22 during the course of a use journey/interaction. The dashboard presents the auditor 46 with an input and output mechanism that can test event-identified hunches through being highly configurable and capable of changing or defining conditions for flagged events contextually relevant to client-side capture and/or filtering for targeted analysis. In sum, the dashboard 46 of the preferred embodiment permits an auditor 46 to recall and replay user interactions responsible for generating alerts following the occurrence of a flagged event. The dashboard also allows for programming changes to be applied to data filters applied by the processing servers 28.

In a preferred embodiment, all data reported from a user journey is initially captured and stored. This permits, for example, a helpdesk operative to interact with a user during a telecomplaint (or otherwise just to experience the user journey and any fault therein) and therefore to experience the precise journey experienced by the user from a start point to a finish point irrespective of whether the finish is premature or final. Data associated with user journeys that do not generate flags, e.g. those user interactions that terminate logically or in an expected fashion, can be disregarded and removed from the database/data aggregator 34. Analysis of data stored in the database 34 may be fully automated based on neural network processing and the identification of feature events that form the backbone of the control logic applied by the neural network 30. For example, in the limit, the neural network can be configured so as to identify both negative and/or positive correlation between reported user interactions and system operational performance. The neural network 30 may therefore obviate the need to identify flagged events since its intuitive and learning nature can highlight aspects of operation and user interaction that are abnormal, unexpected or develop into a recognizable trend.

The processing servers 28 and/or neural network act as a pattern-matching tool for finding user journeys of interest. In a preferred embodiment, pattern-matching looks to correlate reported user interactions with defined "flagged" events believed to be of interest to underlying technical and/or commercial operation of the system. For example, from all uploaded journey report data 23, the processing servers may be tasked to look for a duplicated postcode/zip code entry within a specific journey and then to generate a report on instances when at least double entry of the postcode/zip code occurred. In this case, the duplicate entry would be coded as a "flagged event". From the perspective of a neural network, the duplicate entry would be unusual and thus something either worthy of immediate alarm/reporting or additional monitoring in other independent user journeys.

Figure 2A:
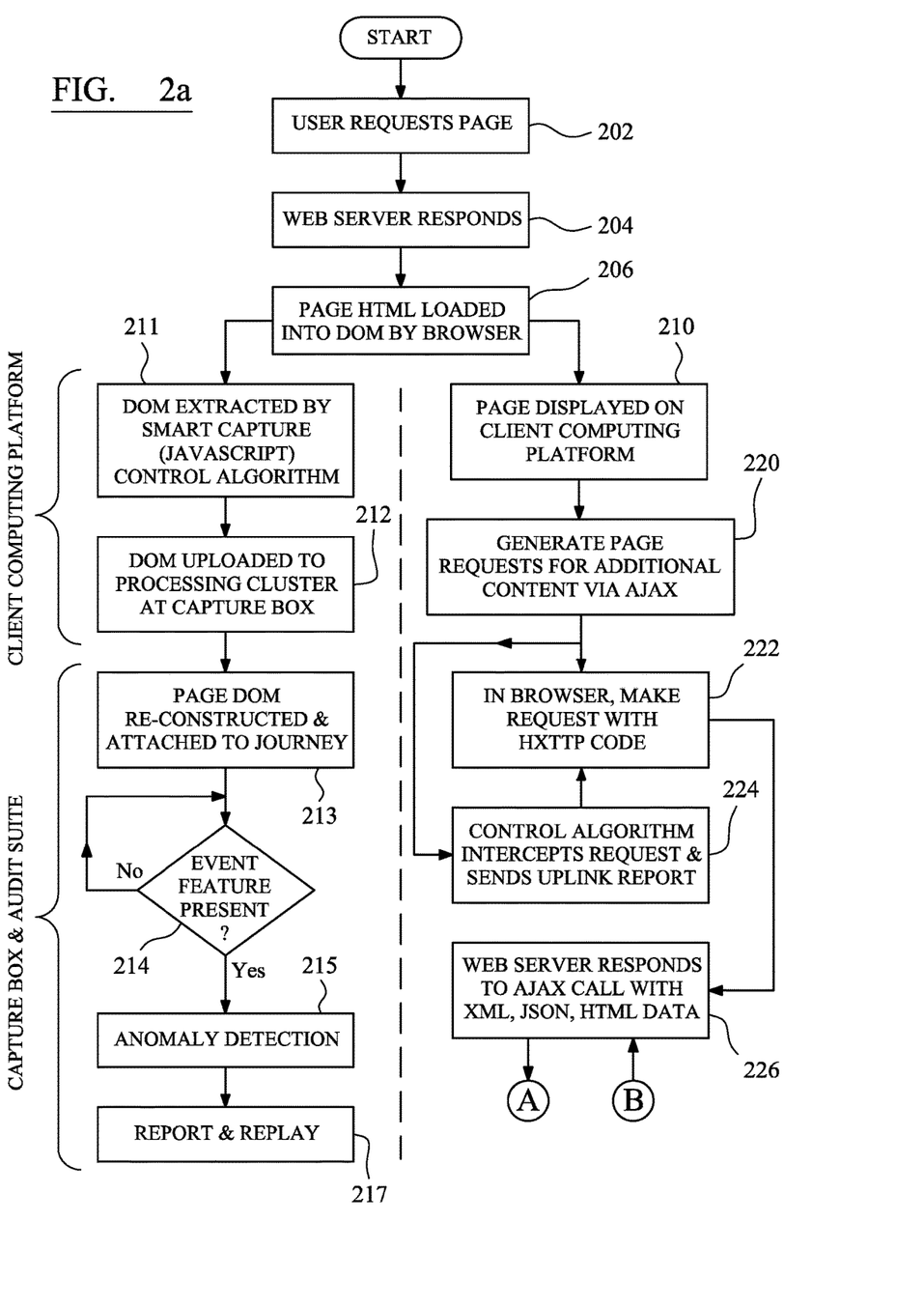
FIG. 2a and FIG. 2b are a flow chart of a preferred process that records, recreate and permits analysis of interactive user sessions with an automated on-line server.
Figure 2B:
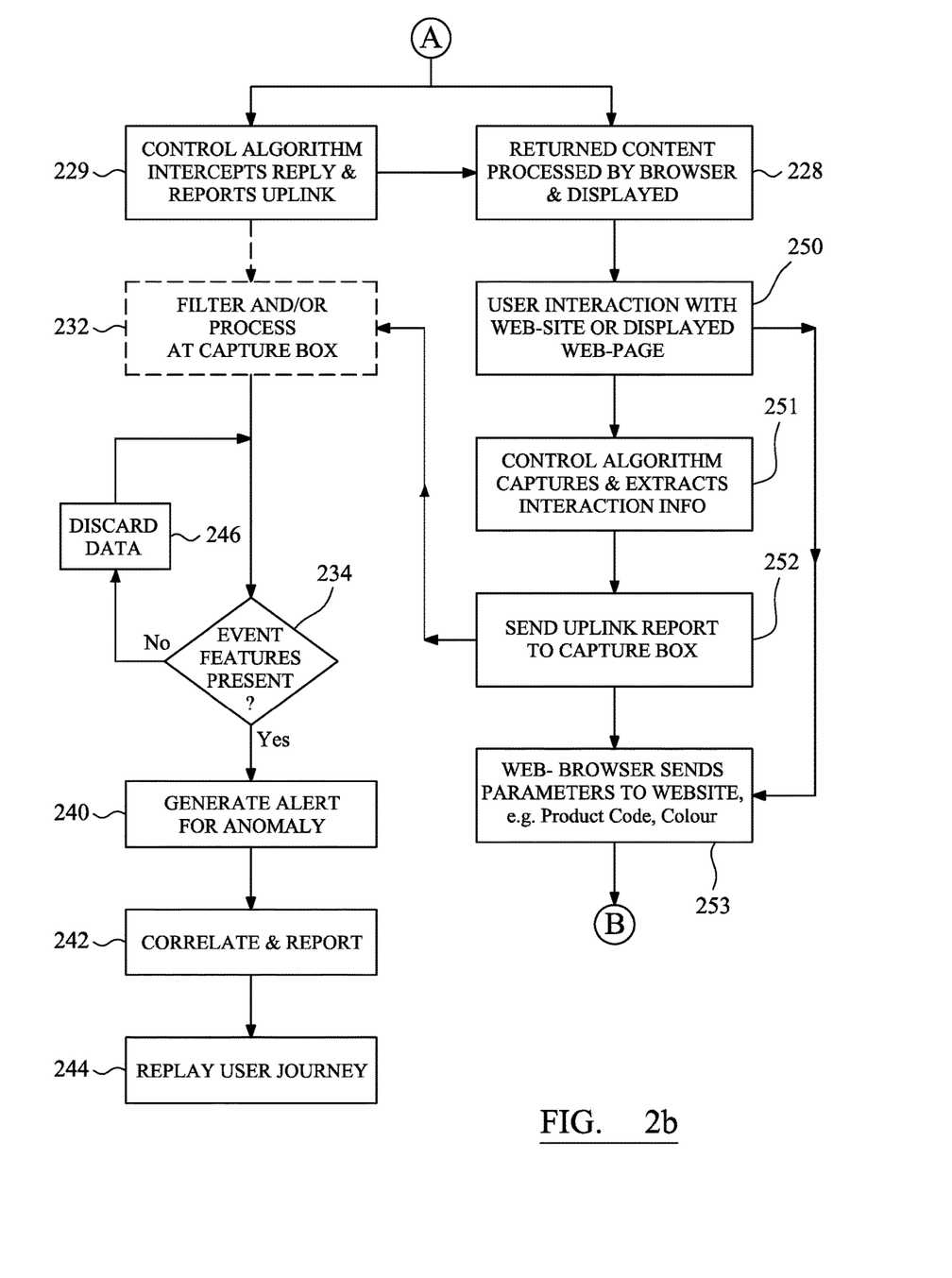
Figure 3:
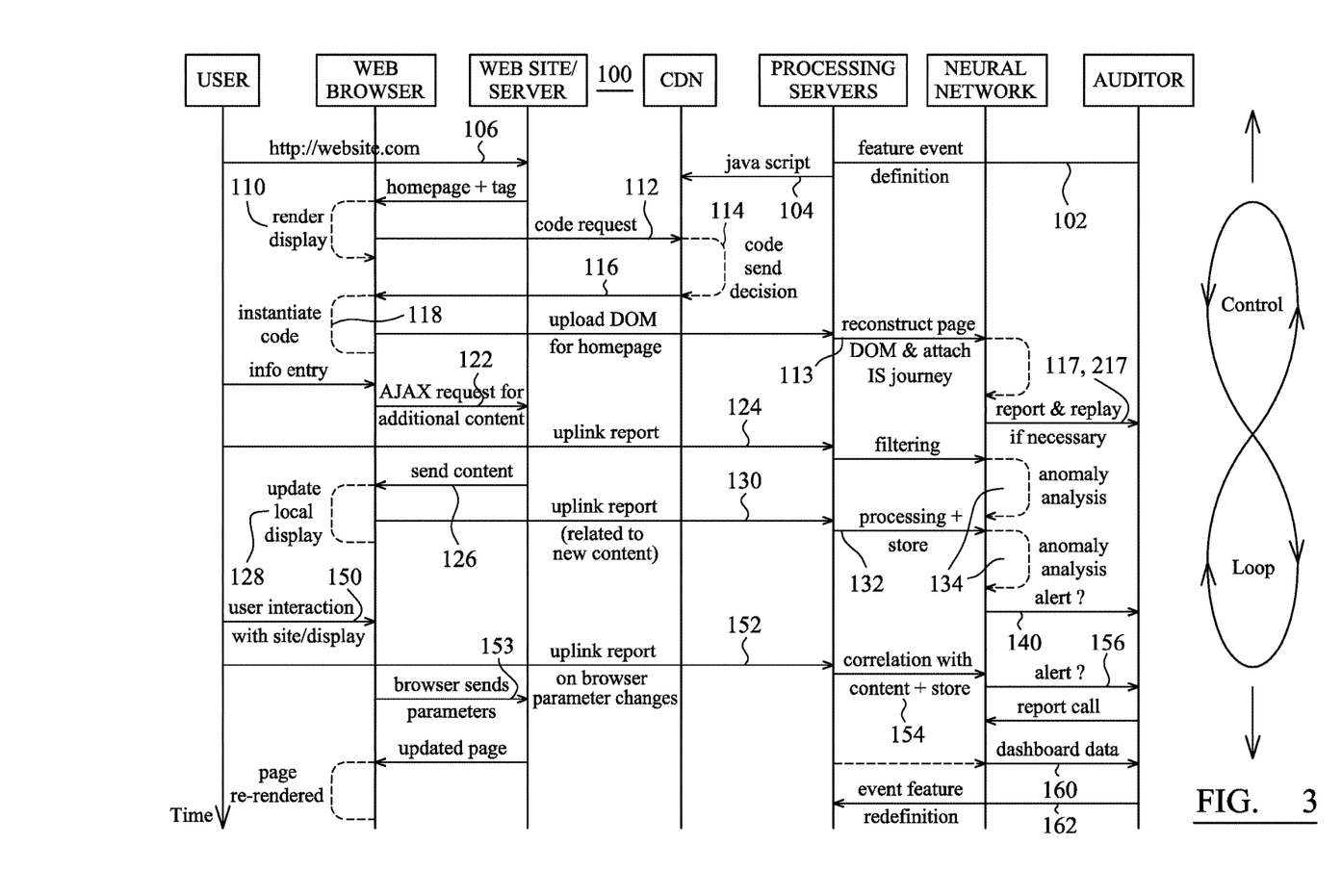
FIG. 3 is an interaction diagram showing messaging and events between components and individuals within the system of FIG. 1.

FIG. 2a and FIG. 2b are a flow chart of a preferred process that records, recreate and permits analysis of interactive user sessions with an automated on-line server. FIG. 3 is an interaction diagram showing messaging and events between components and individuals within the system of FIG. 1. FIG. 2a and FIGS. 2b and 3 should be considered together to explain the audit and user journey replay process 100 of the present invention. It is noted that the nature of interactions and particularly the timing of signaling between system components may take place in a modified time order since, for example, uplinked report updates are preferably sent in the background so as not to slow the rendering of the display and, moreover, user initiated data entry does not necessarily follow a particular plan with respect to the user's use of the web. For example, the user may run multiple screen for different websites, and the simultaneous monitoring of these different web sites by the user journey control algorithm may effect relative reporting. With respect to multiple web-sites, each website may download its own tag that accesses specific JavaScript code modules 18 from the CDN 12, with timing and IP address (for example) used at the processing servers in the capture box to produce a cross-site analysis of user activity. Alternatively, a single JavaScript code module executing on a client machine may monitor all data calls, DOM and AJAX requests for as long as the end user remains on-line or for a fixed period of time.

The process actually begins with the event feature definition being instructed 102 and a suitable JavaScript embedded 104 at a file location within the CDN 12.

On their computing device 22, a user instantiates a web browser and enters a website address 106 to request a page 202. The website responds 204 with a homepage that includes an embedded tag that provides a download from the CDN location that stores the code module required for local monitoring of client e-commerce interactions and user activity, such as keystrokes and data selection. The page HTML [of the homepage], if this is the language used, is loaded 206 into DOM by the browser and the page is rendered 110, 210 on the local display of the user's computing device 22.

As can be seen in FIG. 2a and FIG. 2b, receipt of the homepage will cause DOM to be extracted 211 by the control algorithm, whereafter the related DOM is uploaded 212 to the processing server (cluster) in the capture box 42. This permits the mapping of the user journey in terms of functional action-based events observable to the end user and the re-construction 213. At the capture box, a continuous assessment 214 is made as to the presence of absence of event features, whereafter anomaly detection 215 will cause the generation of a report (if not also an alarm) that permits the captured user journey to be replayed 217 from the perspective of events and actions observed by the end user.

Concentrating for a short time of the instantiation of the full smart capture control algorithm (as shown particularly in FIG. 3), the tag in the homepage may cause a call to be placed to the CDN 12 to request 112 download of full user-replay audit code (i.e. the code module 18) to the user's computing device. The CDN 12 makes a sampling decision 114 and transmits appropriate code back to the user's computing device for one time or multiple use(s). The user-replay audit code is instantiated 118 for at least the sessions or current website 24.

Once the initial homepage is established, the user will typically now interact with the website, such as by entering information 120, e.g. selecting an aspect of the home page or initiating some form a visually perceivable action, e.g. a screen enlargement or the download of additional content. The web browser makes 122, 222 the request for additional information with using an AJAX protocol or the like. Preferably contemporaneously, interception of the AJAX request by the control algorithm causes an uplink report (detailing the change in state of the user's computing device 22) related to the new content request to be communicated 124, 224 to the processing servers (via the SaaS servers) of the capture box 42. Uplink communication can be packet-based or otherwise, and can be over a wired or wireless system. The web-server responds 126, 226 to the AJAX call with XML, JSON or HTML data (or another language/instruction set) that can deliver the requested new content. The new content is locally rendered for display 128, 228 by the web browser on a visual display unit.

With new content now displayed on the user device, the control algorithm operates to send 130 another uplink report based on its interception 229 of the reply from the web-server 20; again, this report is triggered by the nature and detectability of the AJAX signalling. The processing servers 28 process and store 132, 232 data communicated in the uplink message, and allow (for example) the neural network to conduct anomaly analysis 134, 234 reflective of stored event feature definitions. If appropriate, a report and/or alert may be generated 140, 240 and proactively communicated to an auditor, but at least a correlated report is at least made available 242 through the dashboard for later critical assessment of a replayed version of the user journey 244. In the event that no flagged trigger event (otherwise germane to compromised operation or unexpected termination of a user interaction) is present within processed reported data, that aspect of the user journey can be discarded and the corresponding data deleted 246.

Another user interaction 150, 250 with the web-site may now takes place, such as selection of a pull-down menu item. Since this activity will generate an AJAX request, the control algorithm captures and extracts 251 the interaction information and causes a report about parameter changes to be sent 152, 252 to the capture box for processing 154, e.g. correlation with the existing user journey and storage thereof. Related parameter data is passed to the web server, or at least an attempt is made to send 153 the user-entered parameter data to the web-server. Again, to deal with the additional user-activity, the web browser may respond with a refreshed page; this will again cause (amongst other activities) reporting of the supplied content, correlation with the ongoing user journey, the assessment of whether a trigger event has taken place and then the generation, if appropriate, of an alert 156 and/or a report.

In terms of re-construction of the user journey experienced at the end user's computing platform, e.g. tablet, the auditor may respond at any time to an alert that is triggered by the presence of a flagged event contextually relevant to the interactions or operation of the web site. Downloading of reports may also, however, be independent and initiated through the dashboard. Similarly, the auditor can re-define flagged events that are relevant to site operation and/or commercial fulfilment that is anticipated, with re-definition achieved via programming 162 through the dashboard.

It will be further understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

It will, of course, be appreciated that the above description has been given by way of example only and that modifications in details may be made within the scope of the present invention. For example, unless the specific context requires a more limited interpretation, the skilled person will understand that the use of AJAX as the scripting language for capturing data events is exemplary. In other words, alternative embodiments of the present invention may therefore make use of instruction sets that have the effect of capturing client interactions with the web browser and related data calls to the server. The term "AJAX request" should therefore be understood to include all such equivalent, client-side implemented capture instructions.

What is claimed is:

1. A method of recording and recreating an interactive end-user journey with a web-site supported by a web-server, access to the web-site provided over a communications network, the method comprising:

at a computing device of an end-user, during a web session with a web browser, instantiating code modules configured to capture server and request headers from a perspective of the web browser, the server and request headers being data calls between the web browser and the web-site;

sending, to a processing server over the communications network, an uplink journey report including said server and request headers; and at the processing server, in response to receipt of the uplink report journey uploaded by the computing device, executing code to interpret the server and request headers to imply real-time interactions between the (i) end-user, (ii) the web browser executing on the computing device, and (iii) the web-server thereby to re-create and present for review the interactive end-user journey from said implied real-time interactions;

at the processing server, correlating the server and request headers with predefined flagged events related to at least one of operation of the web-server and data processing at the web-server to identify specific user-interactions during the web session; and identifying at least one of a negative and a positive correlation between reported end-user interactions and system operational performance, including identifying end-user interactions that are unexpected or develop into a recognizable trend for multiple end-users.

2. The method according to claim 1 further comprising: providing an access portal through which flagged events can be defined and stored in a database.

3. The method according to claim 1, wherein the code modules are downloaded through the communications network following a request triggered by a tag within a web page, the web page accessed through the web browser and the request sent from a content distribution network.

4. The method according to claim 3, wherein the content distribution network applies logic selectively to control the download of the code modules to the web browser.

5. The method according to claim 1, wherein capturing server and request headers is based on the capture of at least:
   AJAX requests related to end-user interaction; and
   data calls made to an e-commerce server during the web session.

6. The method according to claim 5, further comprising:
at the computing device, executing code to capture and report, to the processing server, mobile gestures that, when executed on a touch screen, bring about a real-world change in display properties of the computing device or computing device operation; and
at the processing server and in a context of a data call to the web-site, receiving an indication of the real-world change in display properties of the computing device or computing device operation occurring at the computing device on a per page basis.

7. The method according to claim 1, wherein the code modules are provided in JavaScript.

8. The method according to claim 5, wherein sending the uplink journey report is contemporaneous with the capture of the AJAX request or the data call.

9. The method according to claim 1, wherein a list of flagged events includes flagged events based on at least one of:
   identified language or text;
   the absence of expected text with a predetermined period of timer;
   web page refresh times or volumes;
   web page load times;
   overall speed of client interactions with the web pages supported on the web browser;
   absolute file or attachment size; or
   repeated interaction behavior.

10. A computer program product stored in a non-transitory computer-readable medium, the computer program product comprising code that, when loaded into a computer, executes to cause the computer to capture and report an interactive end-user journey with a web-site supported by a web-server, the code including operations including: during a web session with a web browser, instantiate code modules configured to capture server and request headers from a perspective of the web browser, the server and request headers being data calls between the web browser and the web-site; and
   send, to a processing server over a communications network, an uplink journey report including said server and request headers, the uplink journey report permitting the processing server to:
   interpret the server and request headers to imply real-time interactions between (i) an end-user, (ii) the web browser executing on the computer, and (iii) the web-server; and
   correlate the server and request headers with predefined flagged events related to at least one of operation of the web-server and data processing at the web-server to identify specific user-interactions during the web session and to recreate for presentation selectable ones of said real-time interactions arising during the web session and reported in the uplink journey report; and
   identify at least one of a negative and a positive correlation between reported end-user interactions and system operational performance, including identifying end-user interactions that are unexpected or develop into a recognizable trend for multiple end-users.

11. The computer program product according to claim 10, further comprising code configured to capture and report:
   AJAX requests related to end-user interaction; and
   data calls made to an e-commerce server during the web session.

12. A system for auditing a web-server application requiring end-user interactions, the system comprising:
   a content distribution network containing a downloadable control code module arranged, when instantiated locally on a computing device running a web browser, to instruct the computing device to:
     capture server and request headers from a perspective of data entry and display events with respect to the web browser, said server and request headers being data calls between the web browser and a web-server; and
     send, to a processing server, an uplink journey report including said server and request headers; and
   a processing server operationally responsive to receipt of uplink report journeys uploaded by at least one computing device, the processing server arranged to:
     interpret the server and request headers to imply real-time interactions between (i) the end-user, (ii) the web browser executing on the computing device, and (iii) the web-server; and
     correlate the server and request headers with predefined flagged events related to at least one of operation of the web-server and data processing at the web-server to identify specific user-interactions during a web session and to recreate for presentation selectable ones of said real-time interactions arising during the web session and reported in the uplink journey report; and processing intelligence coupled to the processing server, the processing intelligence configured to identify at least one of a negative and a positive correlation between reported end-user interactions and system operational performance, including identifying end-user interactions that are unexpected or develop into a recognizable trend for multiple journeys for multiple end-users.

13. The system according to claim 12, wherein the processing server is further configured to provide an access portal through which flagged events can be stored in a database.

14. The system according to claim 12, wherein the content distribution network includes logic that selectively controls the download of the control code modules to the web browser.

15. The system according to claim 14, wherein the control code module causes the computing device on which it is loaded to capture at least:
AJAX requests related to end-user interaction; and
data calls made to an e-commerce server during a web session.

16. The system according to claim 15, wherein the control code module further includes code arranged to capture and report, to the processing server, mobile gestures that, when executed on a touch screen, bring about a real-world change in display properties of the computing device or computing device operation, and wherein the processing server is configured to acquire, within the uplink journey report, an indication of the real-world change in display properties of the computing device or computing device operation on a per page basis.

17. The system according to claim 16, further including at least one software as a service ("SaaS") server, the at least one SaaS server configured to remove uploaded journey reports in a network communication and to buffer at least some of those journey reports for subsequently processing.

18. The system according to claim 17, wherein a list of flagged events includes flagged events based on at least one of:
identified language or text;
the absence of expected text with a predetermined period of timer;
web page refresh times or volumes;
web page load times;
overall speed of client interactions with web pages supported on the web browser;
absolute file and/or attachment size; or
repeated interaction behavior.

19. The system according to claim 13, wherein the processing server is a cloud-based server.

* * * * *